UNITED STATES PATENT OFFICE.

JULIUS HAUFF, OF FEUERBACH, WURTEMBERG, GERMANY.

COMPOUND FOR PRESERVING ANIMAL AND VEGETABLE SUBSTANCES.

SPECIFICATION forming part of Letters Patent No. 234,567, dated November 16, 1880.

Application filed September 16, 1880. (Specimens.)

*To all whom it may concern:*

Be it known that I, JULIUS HAUFF, a citizen of Germany, residing at Feuerbach, Kingdom of Wurtemberg, Germany, have invented new and useful Improvements in Compounds for Preserving Animal and Vegetable Substances, of which the following is a specification.

My invention consists in a preserving compound produced by mixing boric acid and borax, then dissolving the mixture in water, and finally evaporating the solution to dryness.

The antiseptic or preserving qualities of boric acid and of borax are well known, and there is no doubt that the preserving qualities are due entirely to the boric acid contained therein. It appears probable, therefore, that boric acid will be more effective, under all circumstances, than borax corresponding in quantity to an equivalent quantity of boric acid. Such, however, is not the case when dry boric acid is employed, unless the circumstances are particularly favorable to bring the boric acid easily in complete solution. The reason of unsatisfactory results is found in the conditions for dissolving the boric acid, which, in almost all cases, are less favorable than those for dissolving borax, without regard to the fact that boric acid, on account of its fatty nature, is wetted with difficulty, and under certain circumstances, notwithstanding the presence of a surplus of liquid, no complete solution is effected.

In order to obtain a compound which is easily soluble I take two parts, by weight, of boric acid, and one part, by weight, of borax, dissolve the mixture in water and then evaporate the solution to dryness. The result of this operation is a salt which is easily soluble in about ten parts of water, and which is easily wetted.

I have also obtained a good result by mixing three parts of boric acid with one part of borax, and then treating the mixture in the manner above described. The result obtained is much more soluble than pure boric acid, and it shows in the highest degree preserving qualities, rendering the same of great value for preserving animal or vegetable substances, either in a dry state or in solution. Instead of borax (biborate of soda) borates of soda of a higher order, such as tetraborate or pentaborate of soda, may be used, and in this case the proportion of boric acid to be added is slightly changed.

In preparing my compound I have found that a pretty large quantity of water contained in the borax and in the boric acid escapes, and from this fact it may be concluded that said compound is not a mere mechanical mixture, but a chemical composition. Alcohol dissolves boric acid out of this composition.

What I claim as new, and desire to secure by Letters Patent, is—

A dry preserving compound, consisting of a salt formed by the chemical union of borax and boric acid, in the proportions substantially as specified.

In testimony whereof I have hereunto set my hand in the presence of two subscribing witnesses

JULIUS HAUFF.

Witnesses:
 W. HAUFF,
 A. HAUFF.